United States Patent [19]
Farmos

[11] Patent Number: 6,123,636
[45] Date of Patent: Sep. 26, 2000

[54] PROPULSION APPARATUS

[76] Inventor: George T. Farmos, 5733 Crestmont Ave., Livermore, Calif. 94550

[21] Appl. No.: 09/198,902

[22] Filed: Nov. 24, 1998

Related U.S. Application Data

[63] Continuation-in-part of application No. 09/149,768, Sep. 8, 1998.

[51] Int. Cl.[7] .............................. F16H 55/30; B62M 1/04
[52] U.S. Cl. ........................... 474/160; 474/152; 280/252
[58] Field of Search .................................. 474/152–160; 280/252, 253, 254, 256, 257, 210, 230, 241, 258

[56] References Cited

U.S. PATENT DOCUMENTS

| | | | |
|---|---|---|---|
| 588,698 | 8/1897 | Eickershoff | 280/252 |
| 3,132,877 | 5/1964 | Pontin | 280/257 |
| 3,891,235 | 6/1975 | Shelly | 280/252 |
| 3,939,719 | 2/1976 | Stovall | 74/128 |
| 4,169,609 | 10/1979 | Zampedro | 280/252 X |
| 5,104,137 | 4/1992 | Kilts | 280/255 |
| 5,236,211 | 8/1993 | Meguerditchian | 280/252 X |
| 5,690,345 | 11/1997 | Kiser | 474/160 X |

*Primary Examiner*—David A. Bucci
*Assistant Examiner*—Marcus Charles
*Attorney, Agent, or Firm*—Thomas R. Lampe

[57] ABSTRACT

Manually-powered propulsion apparatus for propelling a cycle includes two pedals and two rotatable crank members connected to the drive wheel of the cycle. Two flexible cables are connected to the crank members, one of the cables transmitting power from the pedals to the crank members and the other cable causing retraction of a pedal when the cyclist is applying force to the other pedal.

8 Claims, 6 Drawing Sheets

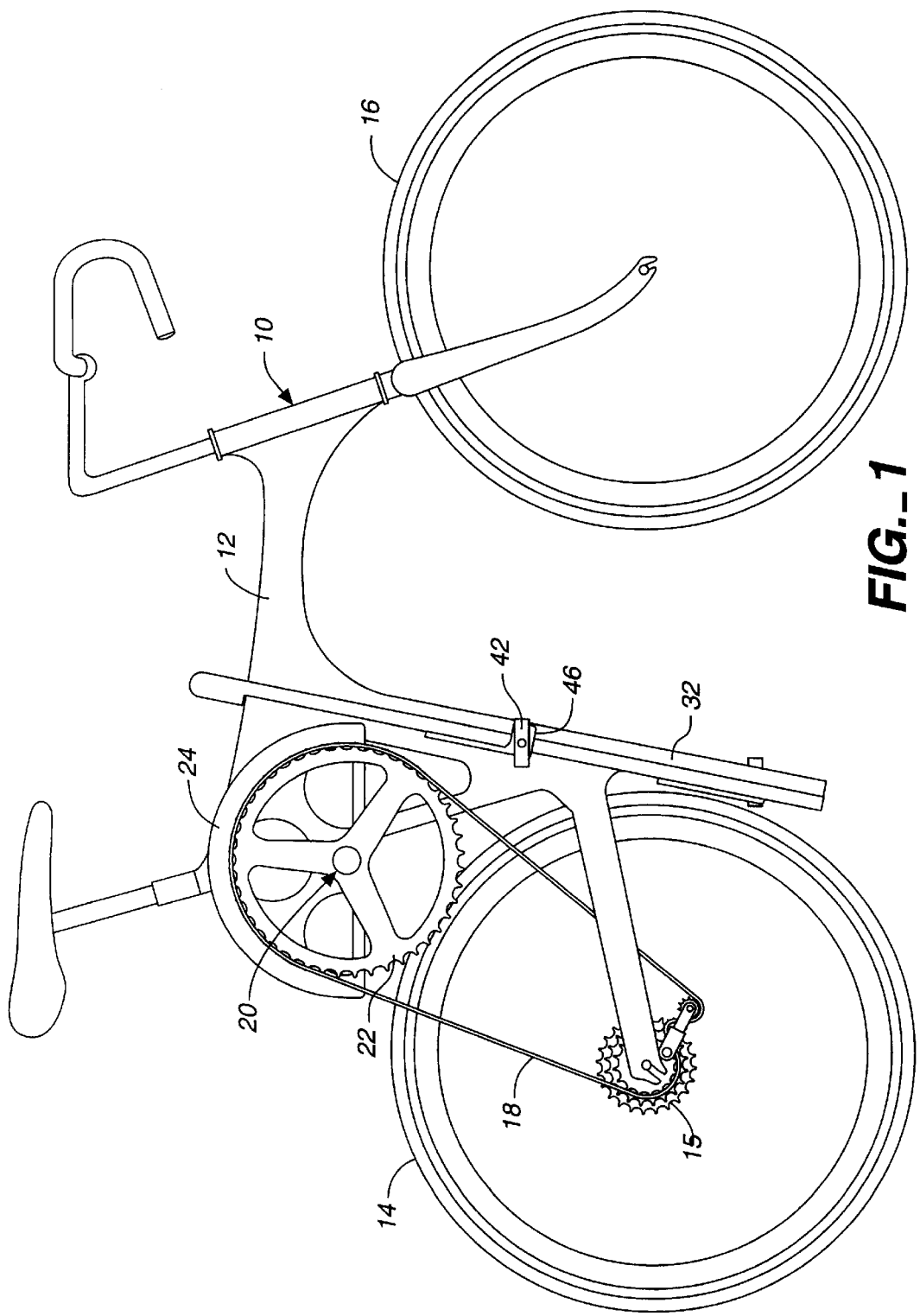
FIG._1

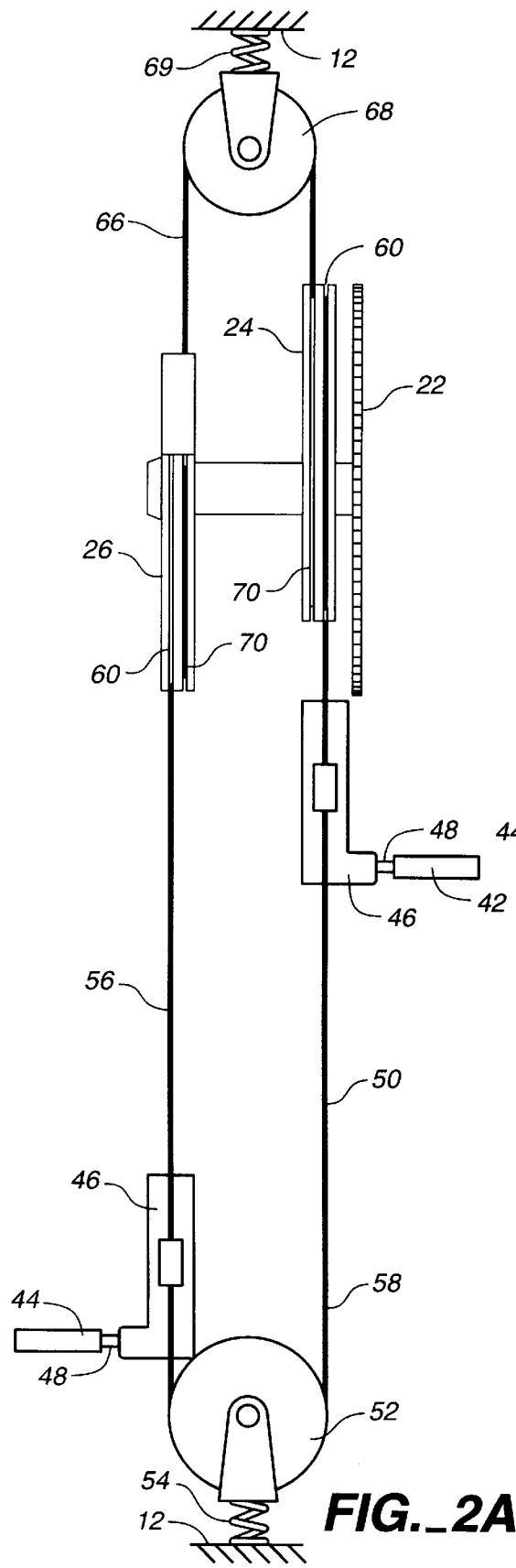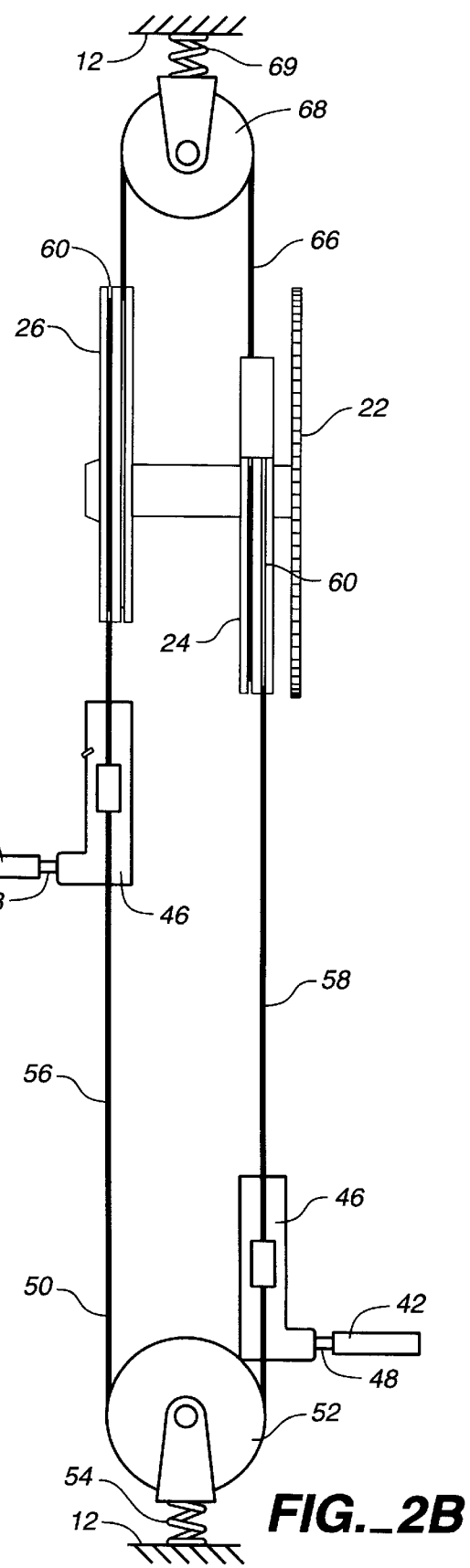

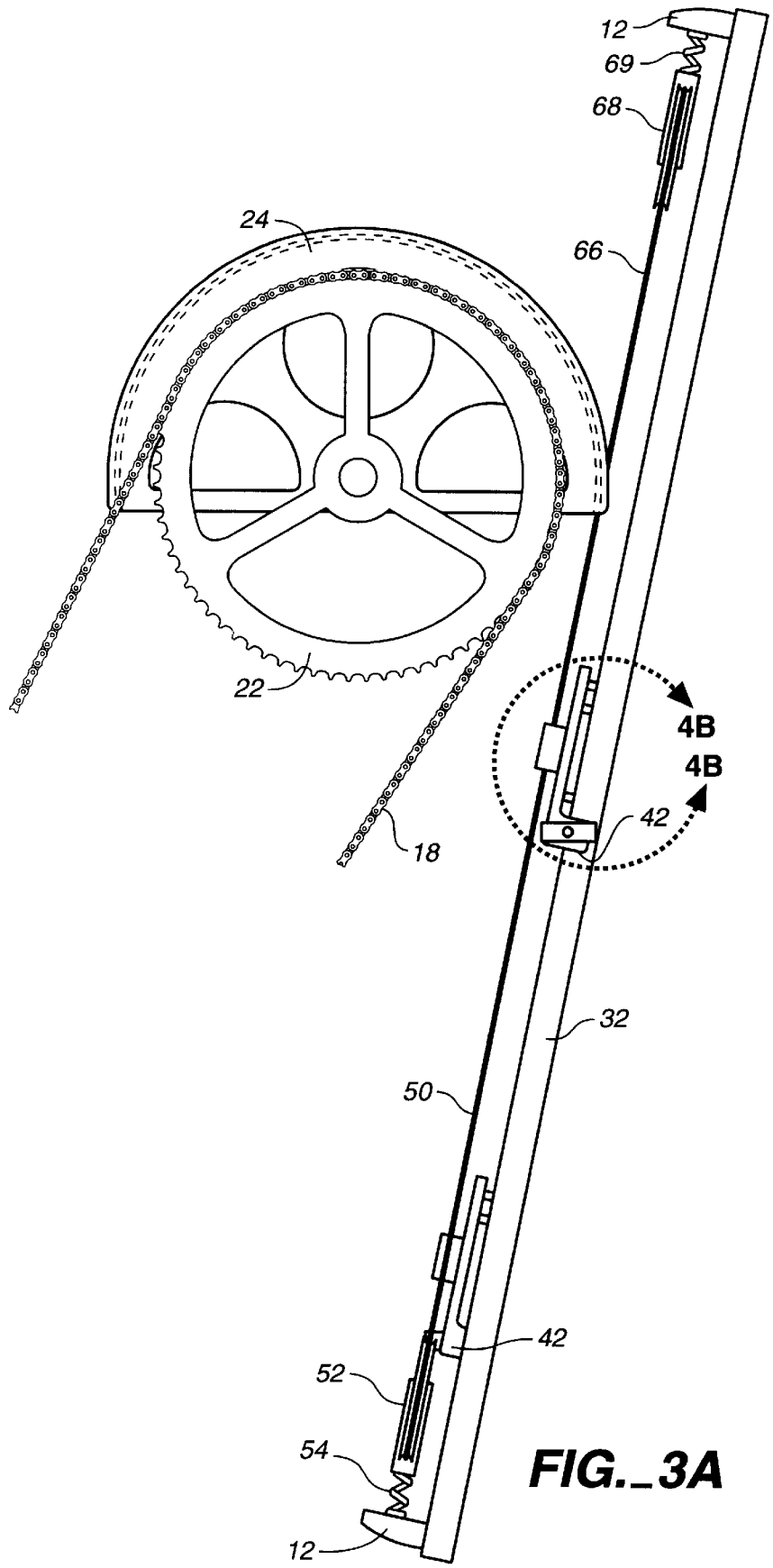
FIG._3A

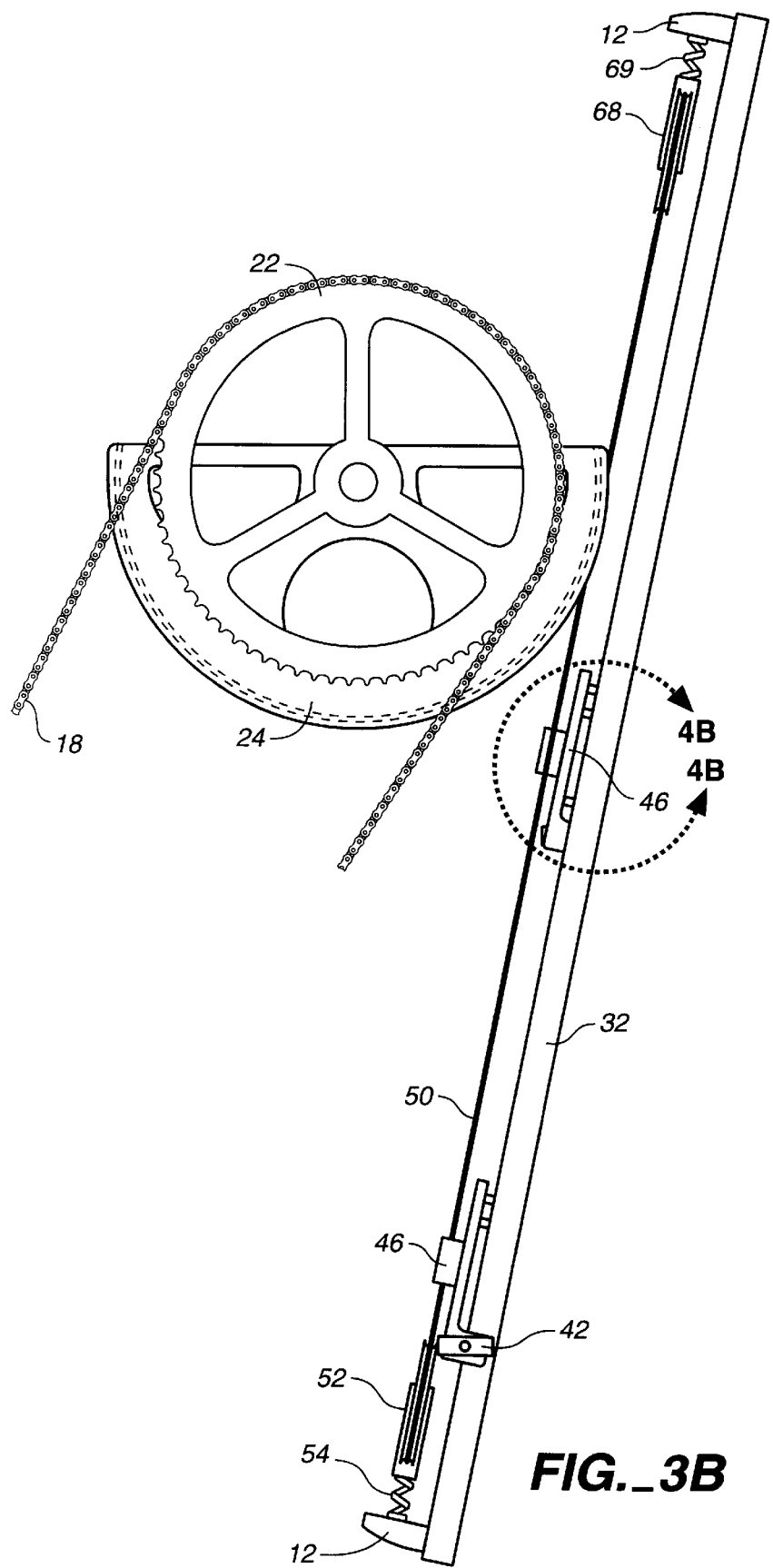
FIG._3B

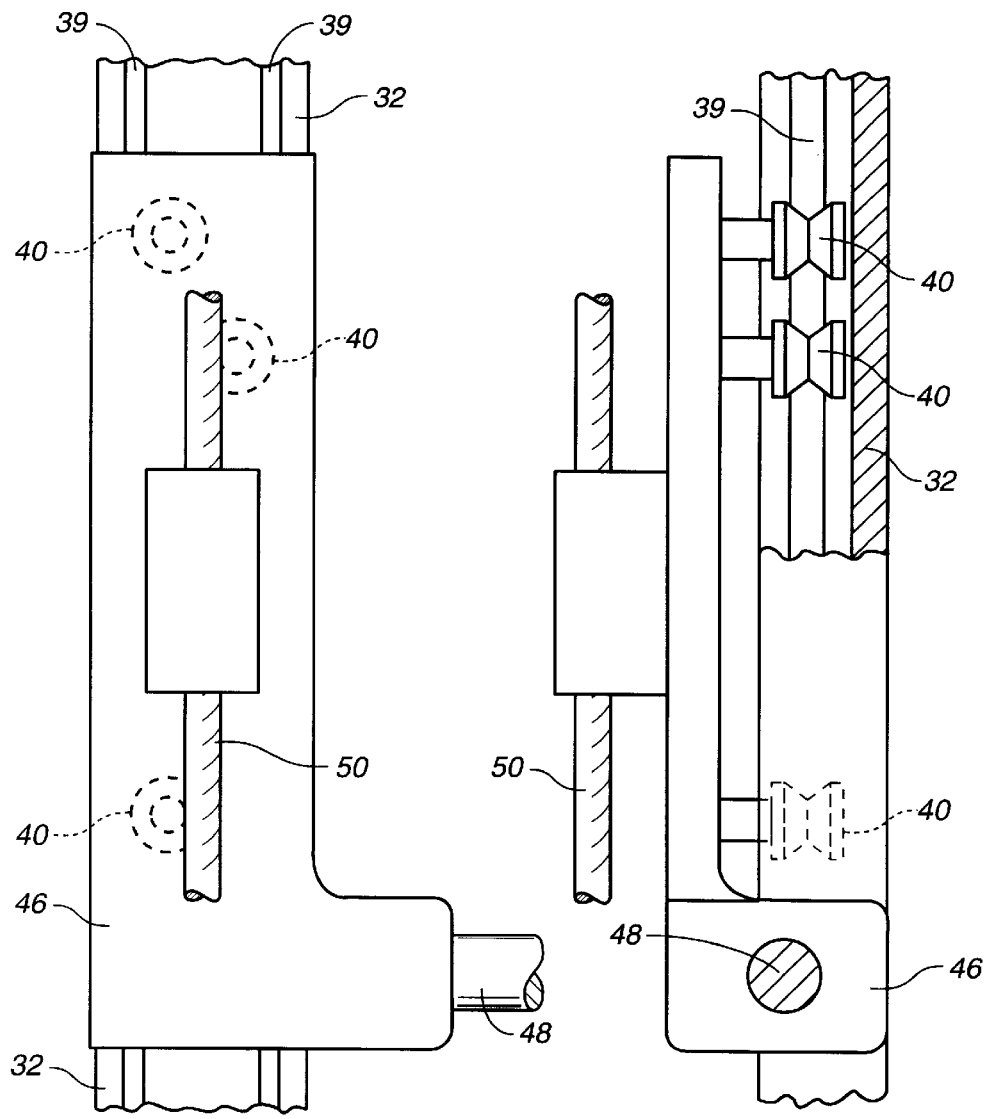
FIG._4A  FIG._4B
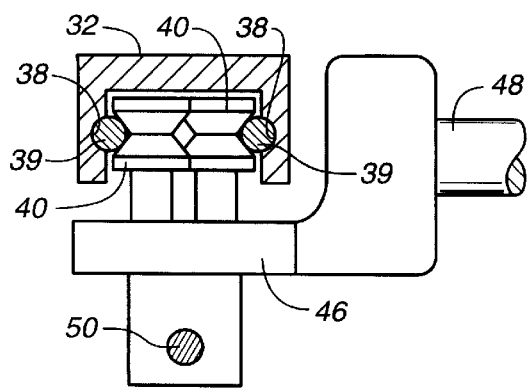
FIG. 4C

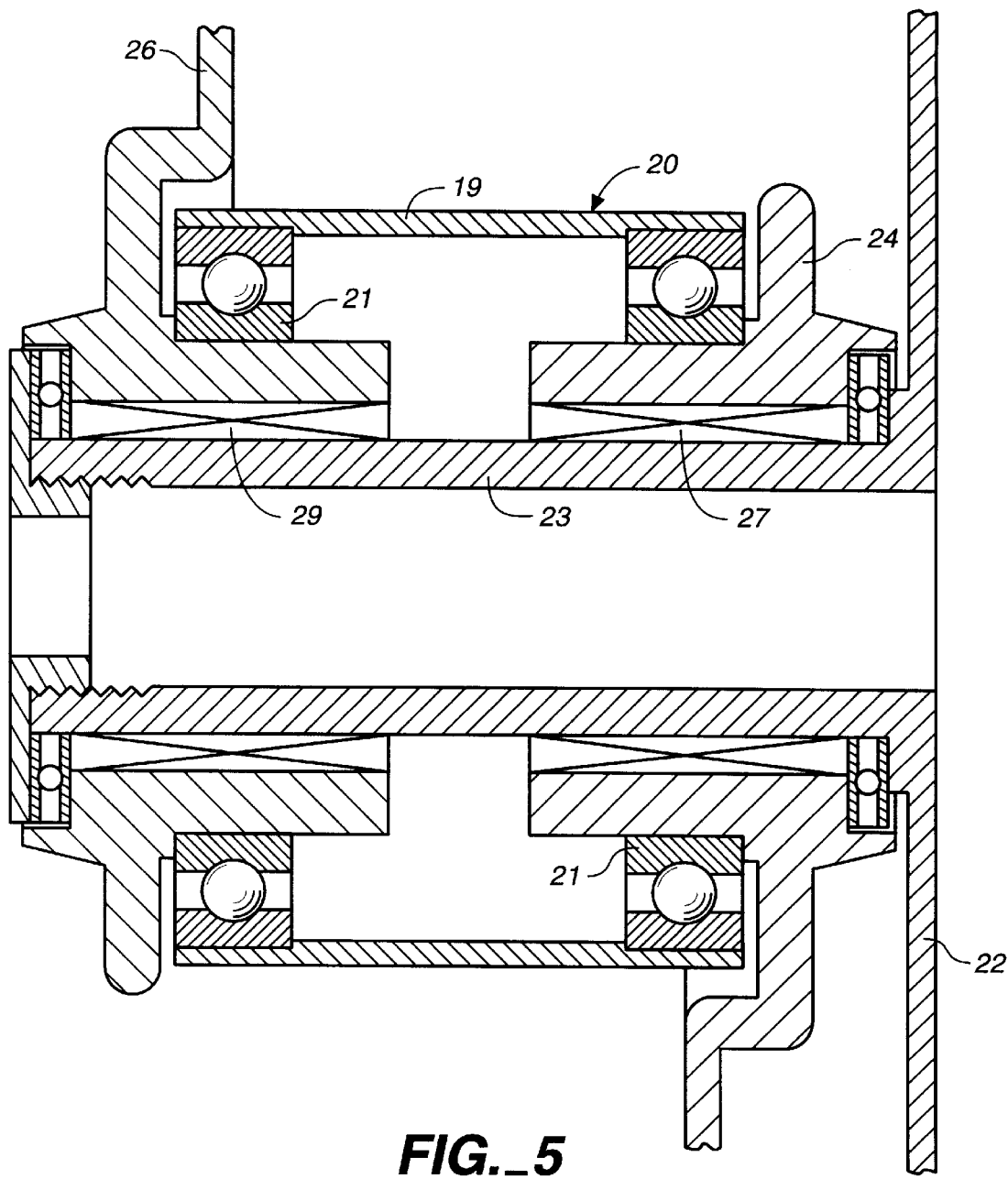
FIG._5

6,123,636

1

PROPULSION APPARATUS

This application is a continuation-in-part of my U.S. patent application Ser. No. 09/149,768, filed Sep. 8, 1998.

TECHNICAL FIELD

This invention relates to manually powered propulsion apparatus. The invention has particular applicability to manually-powered cycles such as bicycles. With respect to the latter, the apparatus propels a bicycle through force exerted by a rider on pedals incorporated in the apparatus.

BACKGROUND OF THE INVENTION

Many propulsion and transmission systems are known in the prior art for use with bicycles and other manually-powered cycles such as exercycles. Most commonly, the cycle is propelled or operated by foot pedals which are connected through suitable transmission means to one or more of the cycle wheels, the pedals rotating about a central axis passing through the cycle frame along a circular path of movement about the axis when pumped by the rider.

My U.S. Pat. No. 5,496,051, issued Mar. 5, 1996, discloses apparatus for propelling a manually-powered cycle including first and second pedals which move along spaced, linear paths of movement. The pedals are connected to the drive wheel of the cycle through a power train including elongated flexible transmission elements which wrap about rotatable crank members used to drive the cycle.

My U.S. patent application Ser. No. 09/149,768, filed Sep. 8, 1998, discloses a manually-powered propulsion apparatus including a flexible transmission member having pivotally interconnected link members which cooperate to form a curved, self supporting structure between a rotatable member of the apparatus and a pedal when the pedal moves from extended to retracted position.

DISCLOSURE OF INVENTION

The present invention also relates to manually-powered propulsion apparatus which may be employed to power a cycle wherein the pedals are operatively connected to the drive wheel of the cycle through elongated flexible transmission means. However, a number of differences exist between the apparatus of the present invention and those of U.S. Pat. No. 5,496,051 and the pending application referenced above. The apparatus of the present invention is characterized by its simplicity of construction, reliability and ease of operation.

The manually-powered propulsion apparatus of the present invention includes first and second pedals and pedal guide means. Mounting means mounts the pedals on the pedal guide means for reciprocating movement of the pedals between retracted and extended pedal positions.

The apparatus also includes a first rotatable crank member and a second rotatable crank member mounted on a cycle frame along with a rotatable driver member.

Pedal interconnecting means interconnects the first and second pedals and is operable to move one of the pedals to the retracted position thereof from the extended position thereof when the other of the pedals is depressed by a force applied thereto and moved to the extended position thereof from the retracted position thereof.

The pedal interconnecting means includes an elongated first flexible member forming a loop and having first and second flexible member segments extending from the loop.

First and second mounts are affixed to the first flexible member at spaced locations on the first flexible member with

2 the first mount affixed to the first flexible member segment and the second mount affixed to the second flexible member segment.

Support means supports the first flexible member on the frame for movement of the first flexible member relative to the frame responsive to depression of a pedal, the direction of movement of the first flexible member resulting from depression of the first pedal being opposite the direction of movement of the first flexible member resulting from depression of the second pedal. The first and second flexible member segments are respectively attached to the first and second rotatable crank members to transfer power alternatively from the first and second pedals through the first and second rotatable crank members to the rotatable driver member for imparting torque to the rotatable driver member responsive to alternate depression of the pedals along the pedal guide means from the retracted positions thereof to the extended positions thereof and rotation of the rotatable crank members by the first flexible member.

Other features, advantages, and objects of the present invention will become apparent with reference to the following description and accompanying drawings.

BRIEF DESCRIPTION OF DRAWINGS

FIG. 1 is a side view of a bicycle illustrating selected structural elements of apparatus constructed in accordance with the teachings of the present invention;

FIGS. 2A and 2B are schematic presentations illustrating selected structural components of the apparatus in alternative relative locations assumed thereby during different stages of operation of the apparatus;

FIG. 3A and FIG. 3B are partial side views illustrating selected components of the apparatus in positions assumed thereby during different stages of operation of the apparatus;

FIG. 4A is a greatly enlarged elevational view illustrating a cable, a pedal mount and related structure employed in the apparatus;

FIG. 4B is an enlarged partial cross-sectional view illustrating components of the pedal mount and guide structure as delineated by the double-headed arrow 4B—4B in FIG. 3B;

FIG. 4C is an enlarged plan view in partial section illustrating structural details of the pedal mount, guide channel and related structure; and FIG. 5 is an enlarged cross-sectional view illustrating in diagrammatic format structure including a clutch and bearing assembly employed in the apparatus.

BEST MODE FOR CARRYING OUT THE INVENTION

Referring now to the drawings, a bicycle 10 incorporating apparatus of the present invention includes a frame 12 and wheels 14, 16. Wheel 14 is driven by a chain 18 connected to a conventional multi-sprocket gear assembly 15.

Connected to frame 12 by any suitable means is an assembly 20. Assembly 20 includes a housing 19 and bearings 21 (see FIG. 5). Rotatably journaled within housing 19 and bearings 21 is a sprocket shaft 23. A rotatable drive sprocket or driver member 22 is affixed to sprocket shaft 23 and extends adjacent to and outwardly of the housing 19. Drive sprocket or driver member 22 is of circular configuration and has teeth about the outer periphery thereof which engage chain 18. Member 22 is rotatable to drive the wheel 14 through the intermediate chain 18.

Located near the opposed ends of the assembly 20 are a first rotatable crank member 24 and a second rotatable crank member 26, the crank members being coaxial with the sprocket shaft 23. As viewed in FIG. 1, clockwise rotation of either first rotatable crank member 24 or second rotatable crank member 26 will result in rotation of the driver member 22, the chain 18 and the wheel 14.

Referring once again to FIG. 5, crank members 24 and 26 are journaled on clutch and bearing assemblies 27, 29, respectively. The clutch and bearing assemblies can be of conventional construction and are illustrated diagrammatically. Rotation of the respective crank members 24, 26 clockwise (as viewed in FIG. 1) will cause rotation of sprocket shaft 23 and driver member 22 through the one-way clutches of assemblies 27, 29. However, the one-way clutches will allow ready counterclockwise rotation of the crank members 24 and 26 without affecting movement of the sprocket shaft and driver member.

Frame 12 of the bicycle includes two parallel frame members 32 which are in the form of channels defining interiors or trackways 36. In the interest of simplicity and clarity, only one such frame member 32 is illustrated, however it is to be understood that the other frame member 32 is of identical construction, the only difference being that it is located on the other side of the frame from that illustrated. My U.S. Pat. No. 5,496,051 may be referred to for a teaching of the concept of employing two trackways disposed side-by-side to guide movement of two pedals of a cycle propulsion mechanism and the teachings of such patent are incorporated herein by reference.

In the embodiment illustrated each frame member (see FIGS. 4A–4C) has parallel recesses 38 formed therein and extending the length thereof. Recesses 38 accommodate elongated rod-like members 39 formed of hard material such as steel or other suitable low friction material which will function as guides in the trackway for rollers 40 operatively associated with pedals employed in the apparatus in a manner which will now be described.

Rollers 40 comprise portions of the mounting means employed to mount pedals 42, 44 to the rest of the apparatus. Pedals 42, 44 are connected to and project from the two pedal mount members 46, the pedals being rotatable on pedal mounting shafts 48 of the mount members. The rollers 40 allow the pedal mount members and pedals to freely move up and down along the trackways 36 of frame members 32.

Connected to each pedal through its associated pedal mount member is an elongated flexible member 50 which in the disclosed embodiment is in the form of a cable. In the interest of simplicity, cable 50 and other structure operatively associated therewith which will now be described have not been illustrated in FIG. 1. However, reference may be had to FIGS. 2A through 4C in connection with the following description.

Cable 50 forms a loop where it passes under a rotatable member in the form of a freely rotatable roller or pulley 52 which is mounted by a coil tension spring 54 to the frame 12 of the bicycle. A housing (not shown) may be incorporated with the frame and utilized to cover the cable 50, pulley 52 and spring 54 and possibly other related structural components. Elongated flexible member or cable 50 includes a segment 56 and a segment 58, such segments being parallel and extending upwardly from the pulley. The free ends of the segments 56, 58 are affixed to the crank members. In particular, the free end of segment 56 is affixed to crank member 26 and the free end of segment 58 is attached to crank member 24.

Each rotatable crank member forms a groove or channel 60 extending along the outer peripheral surface thereof. The channels or grooves 60 receive and accommodate therein those portions of the flexible member segments which are wound on the crank members. In FIG. 2A segment 56 operatively associated with mount 46 is completely unwound from crank member 26, mount 46 and pedal 44 being in extended position. On the other hand, segment 58 is wound about crank member 24 and located in groove 60 thereof, pedal 42 being in its raised or retracted position. The situation is exactly the opposite in FIG. 2B wherein pedal 44 is raised or retracted and pedal 42 is lowered or extended. Any suitable means may be employed to attach the free ends of cable 50 to the rotatable crank members.

A second elongated flexible member 66 in the form of a cable is looped over a rotatable member in the form of a second pulley or roller 68 attached to frame 12 by a coil tension spring 69. Cable 66 is attached to the crank members at spaced locations on the cable; that is, one end of cable 66 is attached to crank member 24 while the other end is attached to crank member 26.

Each of the two end portions of cable 66 is received by and accommodated within a groove 70 formed at the outer peripheral surface of each of the crank members when wound thereabout. Grooves 60 and 70 are parallel to one another in the arrangement illustrated. The locations of attachment of the distal ends of cable 66 to their respective rotatable crank members are such that an end portion of cable 66 will be wound about a crank member when cable 50 is unwound therefrom and vice versa. For example, with reference to FIG. 2A, movement of pedal 44 to its lowermost or extended position indicated will wind cable 66 about crank member 26 within groove 70 thereof as cable 50 unwinds from groove 60 of the crank member 26. This action simultaneously results in unwinding of cable 66 from crank member 24 and winding of cable 50 about crank member 24. The opposite condition is shown in FIG. 2B.

Springs 54, 69 constitute biasing means for tensioning cables 50 and 66 between the pulleys or rollers 52 and 68. More particularly, opposed tensional forces are exerted on the cables which are along an axis substantially parallel to the linear paths of movement of the pedals of the apparatus.

Depression of each pedal will cause rotation of its associated rotatable crank member to in turn cause rotation of driver member 22 of the bicycle to propel same. At the same time, cable 66 will cooperate with the rotatable crank members to move the other pedal to its upper or retracted position. This operational cycle is completed over and over again while the bicycle is being propelled.

The pulley and spring arrangement described above to support the cables and apply opposed tensional forces thereto permits the cables to be movable and displaceable as a unit relative to the bicycle frame along the axis of the tensional forces and in response to forces applied to the pedals. This results in absorption of the shock applied to the cables caused by alternate depression of the pedals and promotes a smooth transition between the pedals during operation of the apparatus.

What is claimed is:

1. Manually powered propulsion apparatus for propelling a cycle having a cycle frame, said propulsion apparatus comprising, in combination:

a first pedal;

a second pedal;

pedal guide means comprising spaced first and second tracks mounted on said frame;

mounting means mounting said first and second pedals on said pedal guide means for reciprocating movement of said first and second pedals between retracted and extended pedal positions, said mounting means comprising a first mount attached to and supporting said first pedal and movable relative to said first track and a second mount attached to and supporting said second pedal and movable relative to said second track;

a first rotatable crank member rotatably mounted on said frame;

a second rotatable crank member rotatably mounted on said frame;

a rotatable driver member connected to said first and second crank members and rotatably mounted on said frame;

pedal interconnecting means interconnecting said first and second pedals and operable to move one of said pedals to the retracted position thereof from the extended position thereof when the other of said pedals is depressed by a force applied thereto and moves to the extended position thereof from the retracted position thereof, said pedal interconnecting means including an elongated first flexible member forming a loop and having first and second flexible member segments extending from said loop, said first and second mounts affixed to said first flexible member at spaced locations on said first flexible member with said first mount affixed to said first flexible member segment and said second mounted affixed to said second flexible member segment;

support means supporting said first flexible member on said frame for movement of the first flexible member relative to said frame responsive to depression of a pedal, the direction of movement of the first flexible member resulting from depression of said first pedal being opposite the direction of movement of the first flexible member resulting from depression of said second pedal, said first and second flexible member segments being respectively attached to said first and second rotatable crank members to transfer power alternatively from said first and second pedals through said first and second rotatable crank members to said rotatable driver member responsive to alternate depression of said pedals along said pedal guide means from said retracted positions thereof to said extended positions thereof and rotation of said rotatable crank members by said first flexible member; and an elongated second flexible member attached to said first and second rotatable crank members at spaced locations on said second flexible member, said second flexible member movable in response to rotation of one of said rotatable crank members by said first flexible member to rotate the other of said rotatable crank members, said support means including a first rotatable member and said apparatus further comprising a second rotatable member, and said first and second flexible members looping respectively about said first and second rotatable members.

2. The apparatus according to claim 1 additionally comprising biasing means operatively associated with said first rotatable member for tensioning said first flexible member.

3. The apparatus according to claim 1 additionally comprising biasing means operatively associated with both said first rotatable member and said second rotatable member for tensioning said first and second flexible members between said first and second rotatable members.

4. The apparatus according to claim 3 wherein said first and second rotatable members exert opposed tensional forces on said first and second flexible members, said pedals moving along parallel linear paths of movement and said opposed tensional forces being along an axis substantially parallel to said linear paths of movement.

5. The apparatus according to claim 1 wherein each of said rotatable crank members has an outer peripheral surface and defines two spaced parallel channels, one of said channels for receiving said first flexible member and the other of said channels for receiving said second flexible member upon rotation of the rotatable crank members.

6. The apparatus according to claim 4 wherein said first and second flexible members are movable and displaceable as a unit relative to said frame along said axis responsive to forces applied to said pedals for absorbing shock applied to said first and second flexible members caused by alternate depression of said pedals and for promoting a smooth transition between said pedals during operation of said apparatus.

7. The apparatus according to claim 3 wherein said biasing means comprises a first spring connected to said first rotatable member and a second spring connected to said second rotatable member.

8. The apparatus according to claim 7 wherein said first and second springs each comprises a coil tension spring.

* * * * *